May 8, 1934.  A. W. HUBBELL  1,958,272
TANK GAUGING APPARATUS
Filed Nov. 6, 1931   3 Sheets-Sheet 1

INVENTOR.
Alfred W. Hubbell
BY Lancaster, Allwine Rommel
ATTORNEYS.

May 8, 1934. A. W. HUBBELL 1,958,272
TANK GAUGING APPARATUS
Filed Nov. 6, 1931      3 Sheets-Sheet 2
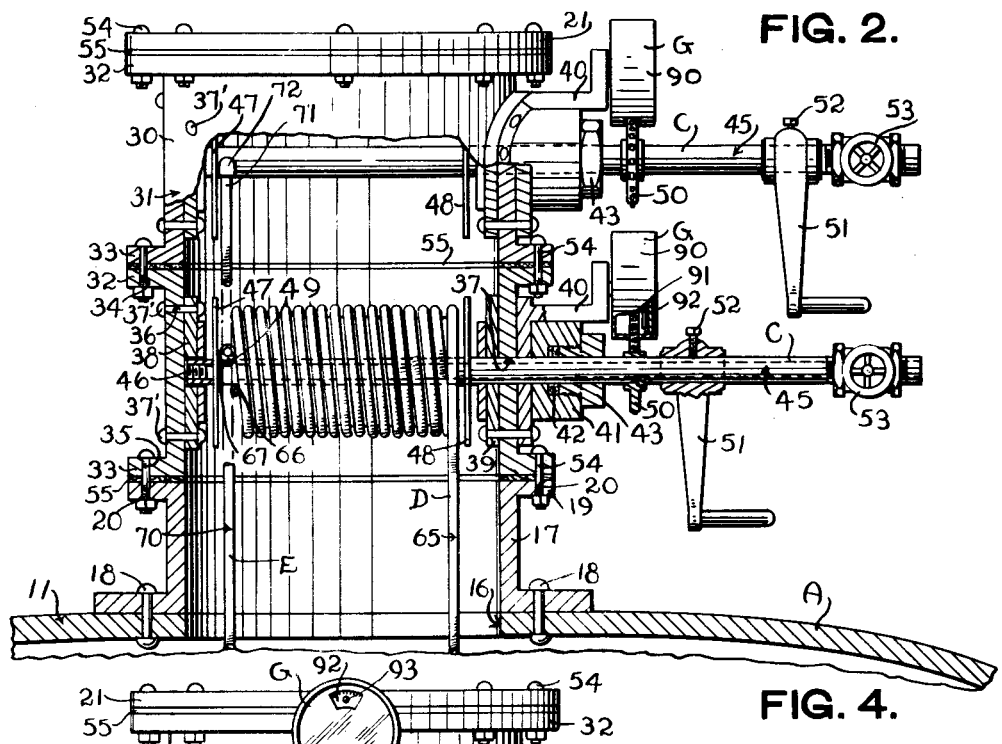
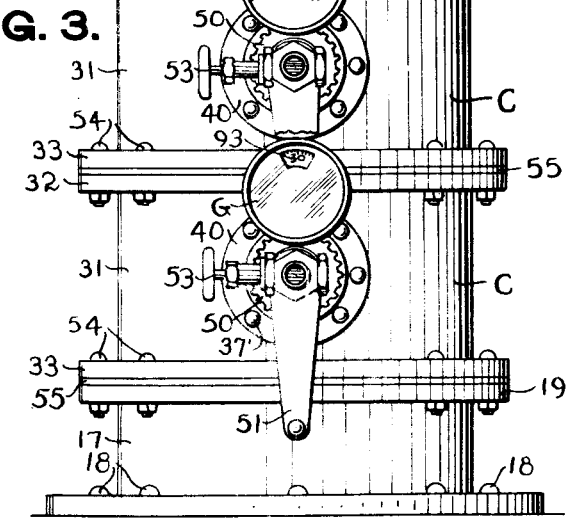
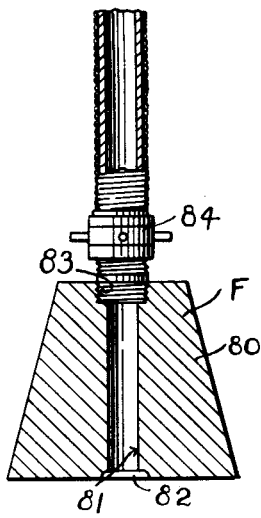
INVENTOR.
Alfred W. Hubbell May 8, 1934. A. W. HUBBELL 1,958,272
TANK GAUGING APPARATUS
Filed Nov. 6, 1931 3 Sheets-Sheet 3
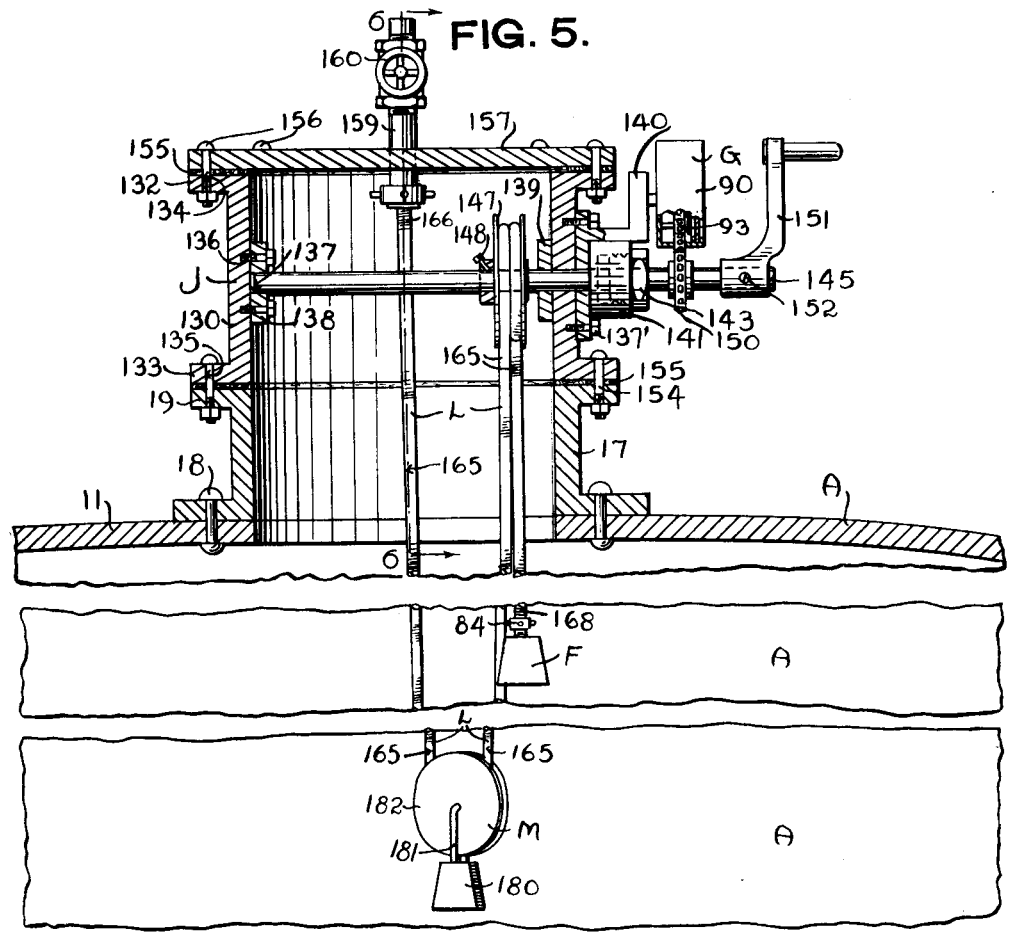
INVENTOR.
Alfred W. Hubbell
BY Lancaster, Allwine & Rommel
ATTORNEYS.

Patented May 8, 1934

1,958,272

UNITED STATES PATENT OFFICE 1,958,272

TANK GAUGING APPARATUS

Alfred W. Hubbell, Bartlesville, Okla., assignor to Phillips Petroleum Company, Bartlesville, Okla., a corporation Application November 6, 1931, Serial No. 573,482

10 Claims. (Cl. 73—120)

This invention relates to improvements in measuring or gauging devices particularly well adapted to be used for measuring the quantity of fluids under superatmospheric pressure in deep storage vessels such as tanks and the like.

In the storage of butane and other petroleum products having a vapor pressure which will not permit their storage in conventional type tanks, it has been found expedient to employ relatively large air tight tanks. As an example, tanks for this purpose, forty feet in height, are now employed, equipped with relatively small manholes at their upper ends. It has been found difficult to gauge the contents of these tanks both because of their great depth and because, for obvious reasons, it is not desirable to remove the manhole cover when carrying on gauging operations.

The principal object of this invention is to provide an improved gauging device which may be employed to gauge the quantity of fluids under superatmospheric pressure contained particularly in deep vessels or containers, such as tanks, but which may be employed to gauge the quantity of fluid under superatmospheric pressure contained in almost any storage vessel.

Another object is to provide a device of this kind which may be employed to gauge the quantity of fluid under superatmospheric pressure contained in a vessel such as a tank, without uncovering the vessel.

Still another object is to provide an improved gauging device which is housed largely within the vessel and need not be removed when filling the same.

Another object is to provide equipment of this kind occupying but little space, easily installed and by the use of which the entire operation of gauging may be accurately done by one operator.

A further object is to provide improved gauging equipment of this kind which also provides an opportunity to secure samples of the contents without uncovering the vessel or agitating the contents to any material extent.

It is also an object of the invention to provide an improved method for gauging the quantity of fluid under superatmospheric pressure within containers.

Other objects and advantages of this invention will be apparent during the course of the following detailed description.

In the accompanying drawings forming a part of this specification and wherein similar reference characters designate corresponding parts thruout the several views, Figure 1 is an elevation of a storage vessel or tank with the preferred embodiment of the improved gauging device installed, parts of the vessel being broken away in order to more clearly show portions within the same.

Figure 2 is a view largely in vertical section of the preferred form of the improved gauging device.

Figure 3 is an end elevation of the same.

Figure 4 is a view largely in vertical section of a weight or depressing means forming a part of the preferred and modified forms of the device.

Figure 5 is a view mostly in vertical section of the modified form of the improved gauging device mounted upon a tank similar to the tank in Figure 1.

Figure 6 is a view on the line 6—6 of Figure 5.

Figure 1:
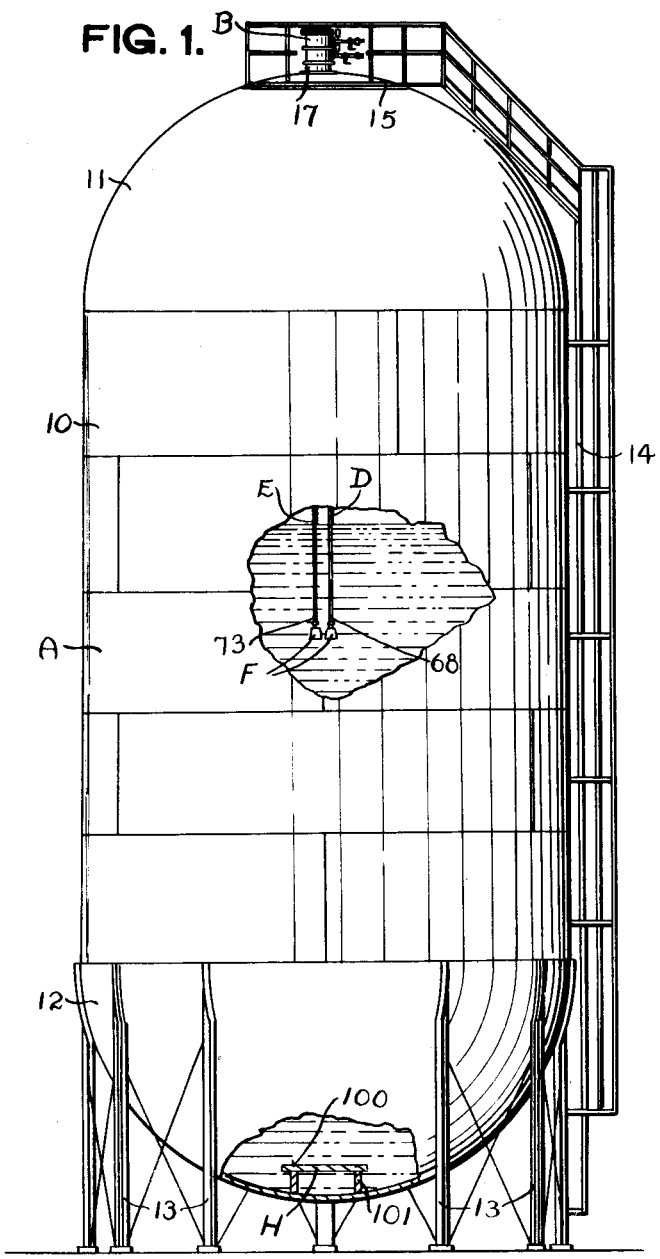

In the drawings, wherein for the purpose of illustration is shown in Figures 1, 2, 3 and 4 a preferred embodiment of the invention, the letter A designates generally a container for fluid under superatmospheric pressure, and B the improved gauging device including means C for manipulating fluid conduits D and E, depressing means F fixed to conduits D and E, counting or registering means G and means H for limiting bottomward movement of the intake end of the fluid conduits.

The container A may comprise a conventional tank for the storage of a large volume of fluid under superatmospheric pressure, the tank having a cylindrical body portion 10, a dome or convex roof 11, a convex bottom 12 resting upon supports 13, and since these tanks are generally very large, a ladder 14 or other means to reach the roof 11 is provided, terminating in a railed platform or landing 15 about the central portion of the roof. This portion of the roof of the tank is generally pierced by a manhole 16 and encircled by a ring 17, secured to the roof by rivets 18 or the like. This ring 17 generally has an outwardly projecting flange 19 at its upper rim, provided with bolt holes 20, and a manhole cover, similar to the portion designated as 21 is provided. As stated above these conventional tanks are often very large, tanks of a depth of forty feet not being uncommon and the use of tanks of this and similar sizes is generally increasing.

The improved gauging device is adapted to be placed over the manhole 16 of the container A and may form a permanent part of the container being built generally of material similar to the container.

The means C includes a preferably cylindrical casing or housing 30 having a body portion 31 of a diameter similar to the diameter of the manhole 17 and is provided with outwardly projecting horizontal flanges 32 and 33 at its top and bottom edges, these having spaced bolt or rivet holes 34 and 35 while the body portion 31 is provided with spaced rivet holes 36 or the like and a shaft opening 37. Firmly secured to the interior of the body portion as by rivets 37' are shaft bearings 38 and 39 comprising arcuate plates or the like, confronting each other. Riveted or bolted to the exterior of the body portion 31 is a bracket 40 carrying a stuffing box 41 with its opening aligning with the shaft opening 37 in the body portion. The stuffing box is provided with packing 42 and a gland nut 43. A hollow or tubular shaft 45 extends from the shaft bearing 38 horizontally across the body portion 31, thru the shaft bearing 39, shaft opening 37, and stuffing box 41 and terminates outside the body as shown in Figure 2. The inner end of the shaft 45 is preferably screw threaded so that a screw threaded plug 46 may be attached thereto closing this end of the shaft. Adjacent each shaft bearing are circular flanges 47 and 48 secured to the shaft, the flanges and shaft acting as a reel. Adjacent the flange 47 is a preferably screw threaded radial opening 49 thru the shaft 45 and communicating with the interior thereof. On the outwardly projecting portion of the shaft is fixed a gear 50 and adjustably carried by the shaft, beyond the gear, is a crank 51 or similar means for rotating the shaft; a set screw 52 securing the crank to the shaft. At the free end of the shaft 45 is a valve 53 or similar closure. Bolts 54 or the like are provided to secure the housing 30 to the ring 17 or two casings together and the manhole cover 21 or cover portion of the housing to the body portion 31. Gaskets 55 are preferably placed between each flange and between the top-most flange and the manhole cover.

The fluid conduit D includes a single length of flexible tubing 65, preferably of rubber covered with metal of a strength sufficient to prevent distortion of the tubing, forming a metallic hose. The outlet end 66 of this tubing is secured by a screw threaded elbow 67 to the shaft 45 at the screw threaded opening 49, the intake end 68 of the tubing extending downwardly into the tank. The tubing is preferably of a length, when unreeled to extend to adjacent the bottom of the container A and when fully reeled in to the full capacity of the reel, to extend to approximately the middle of the container's height, in the case of a deep container. Thus the shaft constitutes a tubing support portion. In the case of a container of less depth, as for instance one of twenty-five feet, the intake end when the tubing is fully reeled in will be close adjacent the reel.

The conduit E which will next be described is provided in the event it is desirable, as in a deep container, to employ two conduits (as shown in Figures 1 and 2). As where the diameter of the housing 30 is not sufficient to accommodate a reel that will receive a length of tubing sufficient to extend to substantially the bottom of tank A and yet be wound on the reel so that the inlet of the tubing may be brought near the top of the tank.

E includes a single length of flexible tubing 70 which is preferably similar in composition to the tubing 65, having an outlet end 71 secured by a screw threaded elbow 72, to the shaft portion 45 of the upper means C shown in Figures 1 and 2. The intake end 73 extends downwardly into the tank, preferably to hang to the same level, when the tubing 70 is unreeled, as the level of the intake end 68 of the tubing 65 when the latter is reeled in to the full capacity of the reel. Thus the tubing 70 will take up the gauging where the tubing 65 ends.

The depressing means F, preferably comprises a body portion 80 of heavy material, having a longitudinal opening 81 therethru and extending from the recessed bottom 82 to the preferably screw threaded top 83 where the means F is secured to the intake ends of the tubing 65 and 70 by means of coupling 84 or the like.

The counting means G comprises a conventional counter 90 provided with a train of gears 91 or the like for slowly rotating a disc 92 on which are figures 93 or the like representing units of liquid measure, or linear measure. One of the train of gears 91 meshes with the gear wheel 50, the counter 90 being mounted upon the bracket 40. If necessary to further reduce the rate of rotation of the disc 92, an intermediate gear 93 may be mounted upon the counter and forms one of the train.

The means H for limiting bottomward movement of the intake end of the several sections of tubing, may comprise a platform or stop 100 spaced by supports 101, or the like, a distance from the bottom of the container and on which the means F at the intake end of the several tubes, comes to rest. Since it is possible when placing the means H to determine the volume or depth of liquid up to the platform or stop 100, this volume or depth can be taken into consideration when gauging the quantity of liquid in the container.

In attaching the improved gauging device B to the container, the manhole cover of the container is removed and the housing of the device bolted, riveted or otherwise attached over the opening to ring 17.

When using only the means C, D, F, G and H, the shaft to which G is attached is turned with the valve closed until F reaches the bottom of the tank or the platform 100. If, for instance, the depth or volume of fluid below this platform is known to be ten feet or ten barrels the counter will register the same. The operator now opens the valve and begins to wind up the flexible tubing 65. Pressure in the tank will cause the liquid in the tank to be forced up thru the conduit D and out of the open end of the shaft 24. The operator continues to wind up the tubing and when the bottom end of the means F emerges from the liquid, vapor will take the place of the liquid in the tubing and exit from the open end of the shaft 24. This will indicate to the operator that the liquid level has been reached and he can then note the reading on the counter and close the valve.

When using in addition to the above, the conduit E, as when gauging a very deep container, and shown in Figures 1, 2 and 3, the shaft to which D is attached is turned with the valve closed until E reaches the bottom of the tank or the platform 100. Similarly to the last mentioned operation, if the depth or volume of liquid below the platform is known to be ten feet or ten barrels the counter will register the same. The operator now opens the valve and begins to wind up the tubing 65. Pressure in the tank will cause the liquid in the tank to be forced up thru the tubing 65 and out of the open end of the shaft. If the liquid level is not reached at the time the tubing 65 is reeled in to the full capacity of the reel, as indicated by the continual flow of liquid out of the shaft outlet, the operator will close the valve thru which the liquid is passing, open the other valve and begin to reel in the tubing 70 attached to the other shaft since this tubing 70 is provided to take up the gauging from the point where the tubing 65 ends, that is, as previously stated, at, for instance, the mid-depth of the tank. The operator will continue to reel in the tubing 70 until vapor takes the place of the liquid emerging from the open end of the shaft at which time he will know that the liquid level has been reached and can note the reading of the second counter and close the valve. The readings added together will give the quantity of liquid in the tank.

In Figures 5 and 6 is shown the modified form J of the device which includes means K for manipulating a fluid conduit L and a means M, movable on the conduit L, for keeping the same taut.

The modified form J, like the preferred embodiment may form a permanent part of the container being built generally of material similar to the container.

The means K for manipulating the fluid conduit L and counting means G of the modified form J of the improved gauging device includes a preferably cylindrical casing or housing 130 having a body portion 131 of a diameter like the diameter of the ring 17 and is provided with outwardly projecting horizontal flanges 132 and 133 at its upper and lower ends, these having spaced bolt holes 134 and 135 while the body portion 131 has screw threaded sockets 136, or the like, and a shaft opening 137. Secured to the interior of the body portion, as by screws 137' are shaft bearings 138 and 139 comprising arcuate plates or the like, confronting each other. Secured to the exterior of the body portion 131 is a bracket 140 carrying a stuffing box 141 similar to the stuffing box 41 with a gland nut 143. A preferably solid shaft 145 extends from the shaft bearing 138 horizontally across the body portion 131 thru the shaft bearing 139, shaft opening 137 and stuffing box 141, and projects outside the housing as shown in Figure 5. Preferably adjacent the shaft bearing 139 is a sheave or pulley 147 adjustably secured to the shaft as by a set screw 148. On the outwardly projecting end of the shaft 145 is fixed a gear 150 and adjustably carried by the shaft, beyond the gear 150 is a crank 151 or similar means for revolving the shaft, a set screw 152 securing the crank to the shaft. Bolts 154 or the like are provided to secure the housing 130 to the ring 17 with gaskets 155 between the flanges of the housing 130 and ring 17. To the upper flange of the housing 130 is secured, as by bolts 156 a cover plate 157. Spaced from the axial center of the cover plate is an opening 158 thru which extends a tube 159 secured to the cover plate and terminating in a valve 160. It is preferred to also place a gasket 155 between the flange 132 and the cover plate 157.

The conduit L comprises a single length of flexible tubing 165 preferably similar in composition to the tubing 65 and 70, having an outlet end 166 secured to the inner end of the tube 159 carried by the cover plate 157 and having communication therewith to the atmosphere outside the housing. Thus the cover plate comprises a tubing support. The tubing 165 hangs downwardly toward the bottom of the container and then is carried upwardly and looped or turned around the pulley 147 and with the intake end 168 extending downwardly toward the bottom of the container. It will be noted in this connection that the pulley 147 is provided with a groove that is in width twice the diameter of the metallic hose or tubing 165. By this arrangement of the tubing 165, on the pulley, slipping and crawling of the tubing on the pulley is prevented. The intermediate portion of the tubing 165 hangs free of the pulley 147 and forms a substantially U-shaped slack portion. As the shaft is rotated to lower the intake end of the tubing 165 into the container, the tubing rolls upon the pulley 147 and the slack portion rises accordingly and is carried over the pulley forming the looped portion until practically all of the slack has been taken up at which time the intake end of the tubing reaches the bottom or adjacent the bottom of the container. Upon reversing the movement of the shaft, the intake end of the tubing will rise and the intermediate portion of the same will roll over the pulley 147 and again form the substantially U-shaped slack portion, increasing in elongation as the intake end rises.

The movable depressing means M for keeping the intermediate portion of the tubing 165 taut, preferably comprises a solid body portion 180 of heavy material provided with a bracket 181 or similar means attaching it to a pulley 182 which rolls along the intermediate or slack portion of the tubing 165 and aids this portion to form the substantially U-shaped section as heretofore referred to and maintain this form.

When using the modified form of the device as in a tank of any depth or where the manhole is of small diameter, the shaft is turned until the depressing means F reaches the bottom or adjacent the bottom of the tank, the operation up to this point being the same as in the case of the use of the preferred form of the gauging device. At this time the depressing means M will have moved along the tubing 165 so that there will be but little slack in the tubing. The operator now opens the valve at the top of the housing and commences to turn the crank or other means for rotating the shaft causing the tubing to travel over the pulley 147 and the means F to rise. The weight 180 comprising a portion of the means M causes the intermediate or slack portion of the tubing 165 to hang downwardly and the elongation of this portion continues until the means F emerges from the liquid. Up to this point liquid will of course issue from the open end of the valve but thereafter vapor will take its place and the operator will know that the liquid level has been reached whereupon he will note the depth or volume of liquid as indicated by the counter G and close the valve. It will be noted that no tubing is actually reeled upon the shaft 145 and increases its diameter, so this device with a small pulley, may be used in tanks where the housing must be small.

Various changes in the shape, size and arrangement of parts may be made to the forms of the invention herein shown and described, without departing from the spirit of the invention or the scope of the following claims.

What is claimed is:

1. In a quantity gauging device for fluids under superatmospheric pressure, the combination of a fluid container, a hollow shaft rotatably carried in and by the container and having communication with the exterior thereof, tubing secured at its outlet end to the shaft within the container and having communication at its outlet with the interior of the shaft, the tubing adapted to normally hang downwardly into the container with its intake end adjacent the bottom thereof, counting means for registering revolutions of said shaft, means gearing said counting means to said shaft and means for rotating the shaft to impart longitudinal movement to the tubing.

2. In a quantity gauging device for fluids under superatmospheric pressure, the combination of a fluid container, a shaft rotatably carried in said container, flexible tubing looped over said shaft within the container, with its outlet end fixedly carried above said shaft by the container and having communication with the exterior thereof and with its intake end adapted to normally hang downwardly into the container, a weighted member at said intake end, and means for revolving the shaft to lower and raise the intake end of said tubing and said weighted member.

3. In a quantity gauging device for fluids under superatmospheric pressure, the combination of a fluid container, a shaft rotatably carried in and by the container, flexible tubing looped over said shaft within the container with its outlet end fixedly carried by the container and having communication with the interior of the same with its intake end adapted to normally hang downwardly into the container and its intermediate portion normally extend downwardly into a substantially U-shaped form between the loop and said outlet end, and means for revolving the shaft lowering and raising the intake end of said tubing.

4. In a quantity gauging device for fluids under superatmospheric pressure, the combination of a fluid container, a shaft rotatably carried by and in the container, flexible tubing looped over said shaft within the container, with its outlet end fixedly carried by the container having communication with the exterior of the same and with its intake end adapted to normally hang downwardly into the container, means for retaining intermediate portions of said tubing taut, as the intake end rises from the bottom, and means for rotating the shaft lowering and raising the intake end and intermediate portions of said tubing.

5. In a quantity device for fluids under superatmospheric pressure, the combination of a fluid container, a shaft rotatably carried in and by the container, flexible tubing looped over said shaft within the container with its outlet end fixedly carried by the container and having communication with the exterior of the container, with its intake end adapted to normally hang downwardly into the container and its intermediate portions to form a substantially U-shaped slack portion between the looped portion and the outlet end, means for retaining the intermediate portion of said tubing taut as the intake end rises from the bottom, and means for rotating the shaft lowering and raising the intake end and intermediate portion of said tubing.

6. In a quantity gauging device for fluids under superatmospheric pressure, the combination of a fluid container, a shaft rotatably carried in and by the container, flexible tubing looped over said shaft within the container with its outlet end fixedly carried by said shaft and having communication with the exterior thereof, with its intake end adapted to normally hang downwardly into the container and its intermediate portion normally extend downwardly into a substantially U-shaped form between the loop and the outlet end; means slidable along said tubing including a weighted portion for retaining the intermediate portion of the tubing taut; and means for turning the shaft lowering and raising the intake end and intermediate portions of said tubing.

7. In a quantity gauging device for fluids under superatmospheric pressure, the combination of a fluid container, a shaft rotatably carried in and by the container, flexible tubing looped over said shaft within the container with its outlet end fixedly carried by said shaft and having communication with the interior thereof, with the intake end adapted to normally hang downwardly into the container and its intermediate portion normally extend downwardly into a substantially U-shape from the loop and the outlet end, a weighted pulley movable along said tubing for retaining the intermediate portion of said tubing taut as the intake end rises from the bottom, and means for turning said shaft lowering and raising the intake end and intermediate portion of said tubing.

8. In a multiple quantity gauging device for liquids under superatmospheric pressure, the combination of a roofed container having an opening in the roof thereof, a housing over the opening, a pair of hollow shafts rotatably carried in and by the housing and having communication with the exterior of the housing, flexible tubing secured to one of the shafts within the housing and having communication with the interior of said shaft, said tubing adapted to normally hang downwardly into the container with its intake end adjacent the bottom thereof, a second flexible tubing secured to the other of said shafts within the housing and having communication with the interior of the shaft to which it is secured, the second tubing adapted to normally hang downwardly into the container with its intake end above the intake end of the first mentioned tubing, and means for independently turning each of said shafts.

9. In a multiple quantity gauging device for liquids under superatmospheric pressure, the combination of a roofed container, having an opening in the roof thereof, a housing over the opening, a pair of hollow shafts rotatably carried in and by the housing and having communication with the exterior of the housing, flexible tubing secured to one of the shafts within the housing and having communication with the interior of said shaft, said tubing adapted to normally hang downwardly into the container with its intake end adjacent the bottom thereof, a second flexible tubing secured to the other of said shafts within the housing and having communication with the interior of the shaft to which it is secured, the second tubing adapted to normally hang downwardly into the container with its intake end at approximately the middle of the depth thereof, means for independently turning each of said shafts and counting means for registering rotations of said shafts.

10. In a quantity gauging device for fluids under superatmospheric pressure, the combination of a fluid container having a bottom and a roof, tubing within the container having an intake end and a discharge end, means carried by the container for raising and lowering the intake end of the tubing towards said roof and towards said bottom, and for supporting said tubing, including a conduit communicating with the atmosphere and into which said tubing opens at its discharge end, and means for registering the extent to which said tubing is raised towards said roof and operatively connected to said first named means.

ALFRED W. HUBBELL.